UNITED STATES PATENT OFFICE.

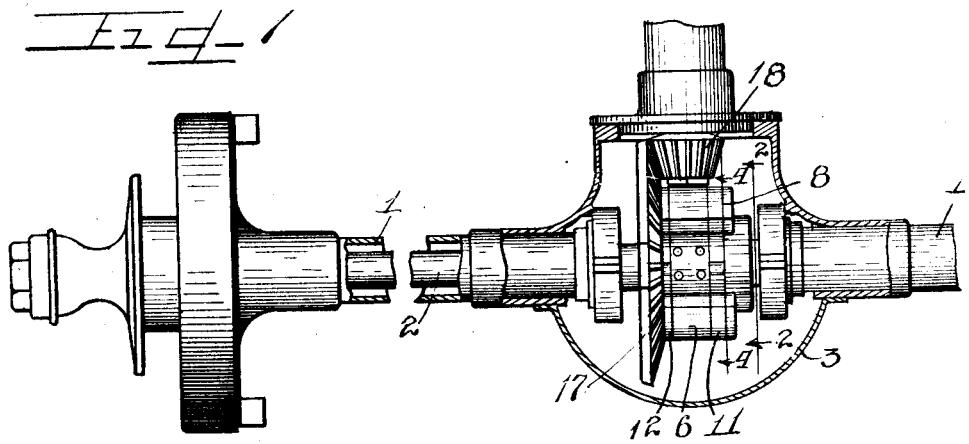
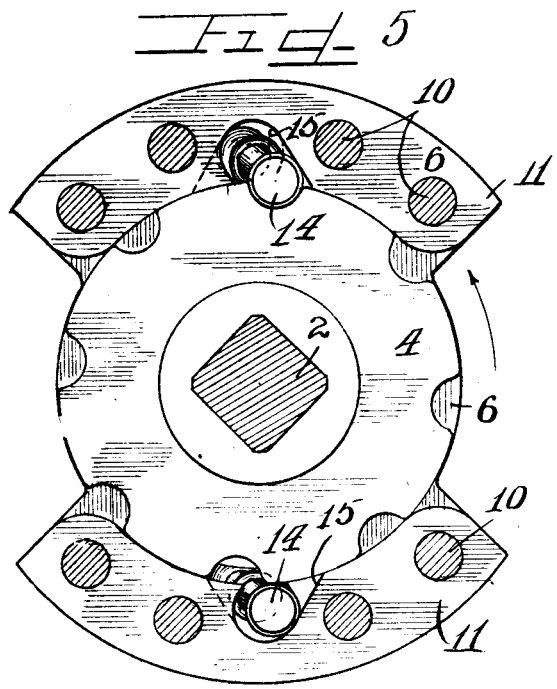

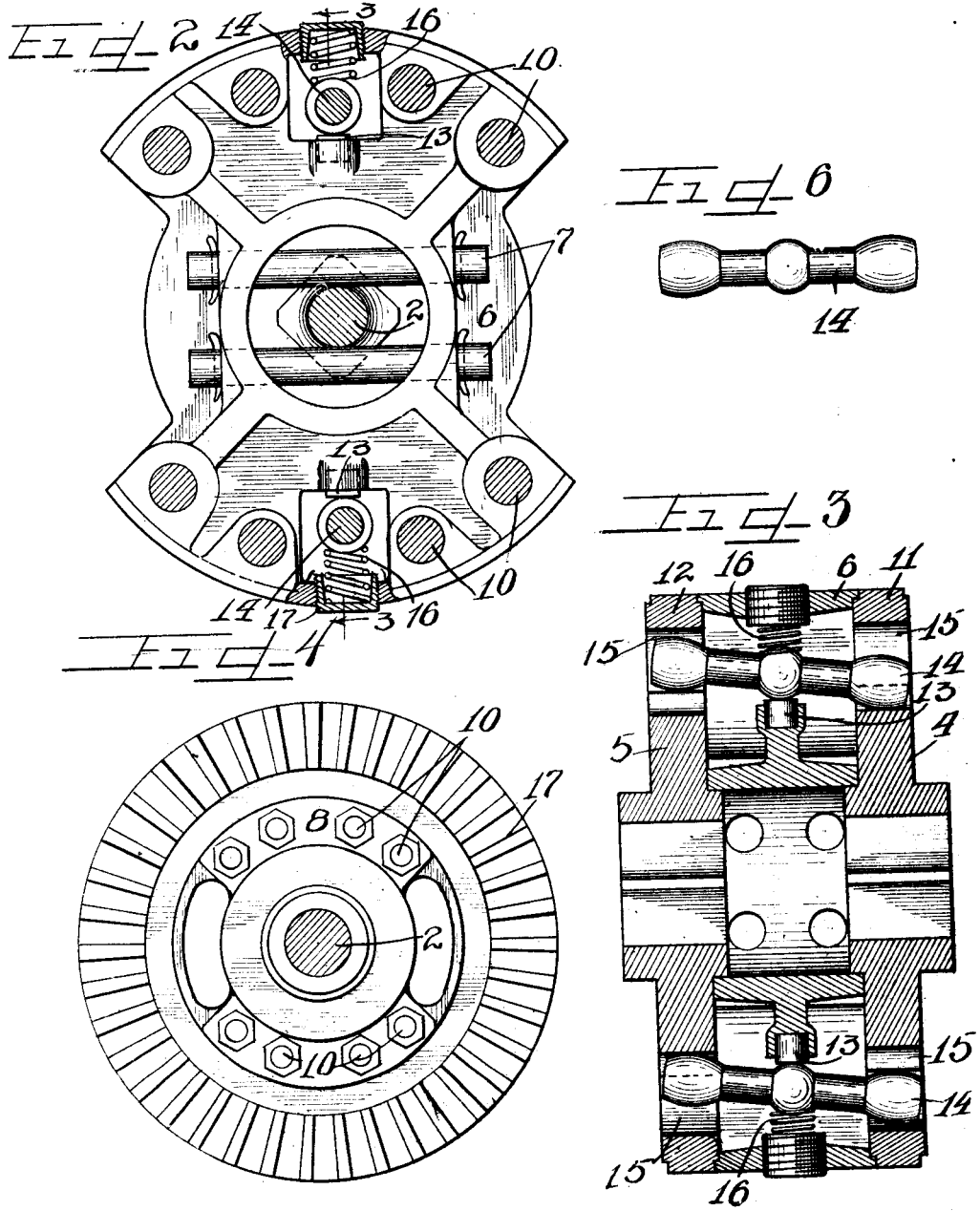

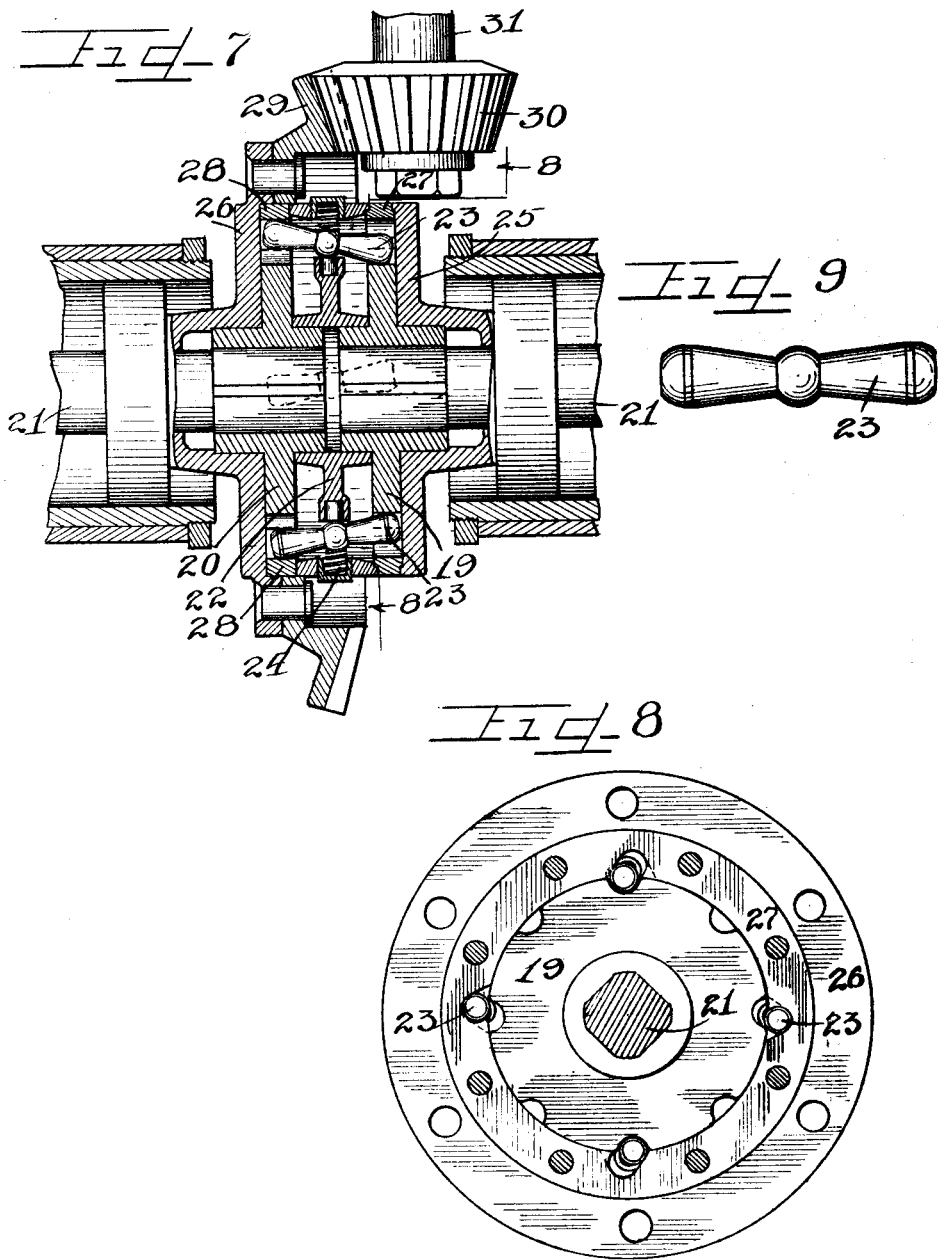

GEORGE D. BAILEY AND FRANK E. RICE, OF DETROIT, MICHIGAN, ASSIGNORS TO GEARLESS DIFFERENTIAL CO., A CORPORATION OF MICHIGAN.

DIFFERENTIAL MECHANISM.

1,180,464.   Specification of Letters Patent.   Patented Apr. 25, 1916.

Application filed May 22, 1915. Serial No. 29,764.

*To all whom it may concern:*

Be it known that we, GEORGE D. BAILEY and FRANK E. RICE, citizens of the United States, and residents of the city of Detroit, in the county of Wayne and State of Michigan, have invented certain new and useful Improvements in Differential Mechanisms; and we do hereby declare that the following is a full, clear, and exact description of the same, reference being had to the accompanying drawings, and to the numerals of reference marked thereon, which form a part of this specification.

Many objections exist to the use of the usual type of differential gear used on motor car rear axles and practically all may be traced to the fact that the rear wheel to which is offered the least tractive resistance, receives the most power from the differential, whereas the wheel having the most traction receives the least power. As a consequence, if one driving wheel of a motor car sinks into a muddy or sandy hole and sufficient traction cannot be obtained by that wheel, the car is stalled for the reason that due to the differential gear, the other wheel does not receive a sufficient amount of the drive to propel the car. If a car is driven over a road wherein the rear wheels do not roll upon the same kind of surface, as for instance with one wheel on the crown of a stone road and the other in dirt or sand at the side, the constantly changing resistance to the respective wheels causes a shifting of power from first one to the other, so that a dangerous side sway is set up, which may result in serious accident, known as "leaving the road."

This invention relates to an improved type of differential wherein a positive direct drive is imparted to the wheel to which the greatest traction resistance is offered, so that as a consequence where the wheels are revolving at different speeds, due to one cause or another, the slower revolving wheel receives the power to propel the car, thus obviating skidding, side sway, or stalling of the car.

It is an object therefore of this invention to construct a differential mechanism provided with differentially movable ratchet wheels and tilting lever pawls for engagement therewith to drive the same simultaneously or differentially, either forward or reversely, as the case may be, with the direct drive being imparted in the case of differential movement to the slower revolving wheel of the vehicle with which the differential is associated.

It is also an object of this invention to construct a differential mechanism consisting of differentially movable ratchet wheels and driving segments with spring impelled tilting levers each operating as a small walking beam to interlock the ratchet wheels with the driving segments, one end of each of said walking beam pawls adapted to interlock with a ratchet wheel for a drive in one direction, and the other end to interlock with the adjacent ratchet wheel for drive in the opposite direction.

It is also an object of this invention to construct an improved type of differential mechanism wherein the respective axle sections of a sectional driving axle have secured thereon ratchet wheels adapted to be driven differentially by a driving segment coacting with walking beam spring impelled pawls, one end of each of which is adapted to drive one of the ratchet wheels in one direction and the other end of which is adapted to drive the other ratchet wheel in the opposite direction, thus preventing the driving means for the different directions, forward and reverse, of rotation, to be engaged simultaneously.

It is furthermore an important object of this invention to construct a differential mechanism wherein tilting levers mounted in a driving ring coact with ratchet wheels to drive the same, one end of each of said levers adapted to drive one ratchet wheel in one direction and the other end of each lever adapted to drive the other ratchet wheel in an opposite direction, the construction, due to the tilting action of the levers, preventing both ends of the same lever to be engaged simultaneously with the ratchet wheels.

It is finally an object of this invention to construct a simplified and silently operating differential mechanism which acts to drive the slower revolving wheel of a vehicle and which may be installed within the axle housing for replacement of the differential gear on motor cars already in use.

The invention (in a preferred form) is illustrated in the drawings and hereinafter more fully described.

In the drawings, Figure 1 is a fragmentary plan view partly in elevation and partly in section of a motor car axle equipped with a differential mechanism embodying the principles of our invention. Fig. 2 is a detail sectional view with parts omitted, taken on line 2—2 of Fig. 1. Fig. 3 is a detail section taken on line 3—3 of Fig. 2, with parts omitted. Fig. 4 is a detail section taken on line 4—4 of Fig. 1, with parts omitted. Fig. 5 is a detail section taken on line 5—5 of Fig. 1, with parts omitted. Fig. 6 is a detail view of one of the tilting walking beam levers or pawls. Fig. 7 is an enlarged sectional detail of a slightly modified construction of differential mechanism. Fig. 8 is a detail section on line 8—8 of Fig. 7, with the bevel gear omitted. Fig. 9 is a detail view of one of the tilting walking beam pawls.

As shown in the drawings, the reference numeral 1, indicates a housing for axle sections 2, the inner ends of which project into a differential housing 3, suitable bearings of course being provided in the housings for said axle sections. Secured on the inner ends of the respective axle sections 2, which are squared for the purpose, are ratchet wheels 4 and 5, respectively, and journaled on the inner hub extensions of said ratchet wheels is a pawl carrying recessed element 6, the hub of which is apertured, as clearly shown in Fig. 3, to receive bolts 7, therethrough. Journaled upon the respective axle sections 2, and lying flat against the outer surface of each of the respective ratchet wheels 4 and 5, are end members 8 respectively, which are substantially the same shape as the carrying element 6, and are rigidly secured thereto by a number of bolts 10, which of course are of a greater radial distance from the axle sections than the outer periphery of the respective ratchet wheels 4 and 5. Rigidly held associated with said carrying element by means of the bolts 10, are pairs of driving ratchet segments 11 and 12, respectively, which are disposed intermediate the respective end members 8 and the carrying element 6. Secured in radial extensions which project into the recesses in said driving element 6, are hardened steel seat members 13, upon which rest tilting levers or walking beam pawls 14. As clearly shown in Fig. 5, the ends of the respective pawls 14, project through inclined recesses 15, provided in the respective ratchet segments, one side or wall of a recess forming an abutment to contact the end of a pawl and hold the same seated in the ratchet wheel to drive the same, and the other side or wall of the recess acting to move the pawl out of engagement with the ratchet wheel and into the recess.

Coiled springs 16, are seated in plugs threaded into the driving element 6, and bear upon the rounded middle portion of each of the pawls 14, to hold the same upon the hardened steel seats 13, provided therefor. As clearly shown in full lines in Fig. 5, the recesses 15, in the ratchet segment 11, are each directed oppositely, and similarly the recesses in the ratchet segment 12, are also each directed oppositely, as shown in dotted lines. A bevel gear 17, forms a part of one end member 8, as clearly shown in Fig. 4, and meshing therewith to drive the same is a small bevel pinion 18, mounted in any suitable manner upon a drive shaft projecting into the differential housing 3.

In the modification of our invention illustrated in Figs. 7, 8, and 9, we have shown ratchet wheels 19 and 20, secured upon the inner end of axle sections 21, and journaled on the hubs of said ratchet wheels is a pawl carrying ring 22, bearing tilting pawls 23, somewhat similar in shape to the pawls 14, described in the previous construction, and acting in a similar manner, being held resiliently in place by coiled springs 24. Journaled on the outer hub extensions of the respective ratchet wheels 19 and 20, are end members 25 and 26, and rigidly secured between said end members and the pawl carrying ring 22, are driving ratchet rings 27 and 28, respectively. As clearly shown in Fig. 8, in this construction four pawls 23, are provided, and four recesses are provided in each of the ratchet rings 27 and 28, respectively, two of said recesses, as clearly shown, being directed one way and two oppositely thereto. The end member 26, is provided with an extended flange to which is attached a bevel gear ring 29, which is adapted to be driven by a bevel pinion 30, secured upon a drive shaft 31.

The operation is as follows: In the construction illustrated in Figs. 4 to 6 inclusive under normal operating conditions wherein the axle sections 2, revolve at the same rate of speed, one of the pawls 14, drives the right hand ratchet wheel 4, and the other pawl, the left hand ratchet wheel 5, secured upon the respective axle sections. The drive to the ratchet wheels is effected by wedging of the end of a pawl into one of the recesses of the ratchet wheel by the ratchet or driving segment which is disposed concentrically about the ratchet wheel and having the recesses 15, directed oppositely, the one for driving the ratchet wheel forwardly and the other reversely. Due to the tilting action of the pawls 14, it is possible for only one end of either of the pawls to be in driving engagement at any one time, but said pawls are each adapted to drive both of the ratchet wheels, that is one end of one of the pawls is adapted to drive one ratchet wheel in one direction and the other end thereof is adapted to drive the other ratchet wheel in an opposite direction. Inasmuch as the respective driving or ratchet segments 11 and 12, for the respective ratchet wheels 4 and 5, have the recesses 15, thereof alongside of one another and directed oppositely, as shown in full and dotted lines in Fig. 5, it is evident that when one wall of one recess impels one end of a pawl downwardly into engagement with its respective ratchet wheel that the opposite wall of the other recess in the adjacent driving segment will elevate the other end of the pawl, such position of the pawls being clearly shown in Fig. 3.

With the position of the parts illustrated in Figs. 3 and 5, the right hand end of the upper pawl and the left hand end of the lower pawl are in driving engagement with the respective ratchet wheels 4 and 5, to drive both of the axle sections forwardly or in the direction of the arrow shown in Fig. 5. The right hand end of the lower pawl 14, as clearly shown in Figs. 3 and 5, is out of driving engagement with the ratchet wheel 4, and similarly the left hand end of the upper pawl is out of driving engagement with the ratchet wheel 5. However, in the event of the drive of the motor car being reversed by properly shifting the transmission gears, the respective abutment walls of the recesses 15, of the driving segments 11 and 12, will cause the pawls to tilt oppositely from the position shown in Figs. 3 and 5, so that the left hand end of the upper pawl will engage the ratchet wheel 5, and the right hand end of the lower pawl will engage the ratchet wheel 4. Assuming the pawls to be in the position shown in Figs. 3 and 5, with the respective ratchet wheels 4 and 5, driven in the direction of the arrow shown in Fig. 5, and that the wheel 4, is caused to rotate faster than its driving segment 11, due to the vehicle rounding a corner or some other cause, then the right hand end of the upper pawl, upon striking the opposite wall of the recess 15, will be elevated out of engagement with the ratchet wheels and lifted up from its seat 13, against the compression of the spring 16, and will click over the recesses in the ratchet wheel until the speed of rotation of the ratchet wheel again equals that of its driving segment 11. Of course in the event that both of the ratchet wheels 4 and 5, tend to rotate faster than their driving segments 11 and 12, assuming the pawls to be in the position shown in Fig. 3, the right hand end of the upper pawl will first be elevated out of engagement with the ratchet wheel 4, and the left hand end of the lower pawl will be moved out of engagement with the ratchet wheel 5, and a slight relative movement then taking place between the segments 11 and 12, and the ratchet wheels, the pawls will again be engaged but tilted oppositely, that is the left hand end of the upper pawl will engage the ratchet wheel 5, and the right hand end of the lower pawl will engage the ratchet wheel 4, so that the ratchet wheels, being rotated by the wheels of the vehicle as they coast along, will serve to drive the associated driving elements of the differential device.

In the modified form of construction illustrated in Figs. 7 to 9 inclusive, the operation is identical, structural differences, however, having been made so as to use more pawls, for heavier types of motor cars. Due to the fact that each pawl performs two functions, that is to drive one ratchet wheel in one direction by tilting one way, and to drive the other ratchet wheel in the other direction when tilted the other way, it is obvious that the pawl interlocking mechanism between the associated driving elements and the ratchet wheels cannot possibly become engaged accidentally to lock a reverse drive for one of the ratchet wheels during a forward rotation of the parts, except in the instance described in the foregoing paragraph, wherein the rear wheels of the vehicle serve to drive the driving mechanism when the vehicle is coasting.

We are aware that various details of construction may be varied through a wide range without departing from the principles of this invention, and we therefore do not purpose limiting the patent granted otherwise than necessitated by the prior art.

We claim as our invention:

1. In a device of the class described the combination with axle sections, of ratchet wheels secured thereon, recessed ratchet segments journaled thereabout, a carrying element interposed between said ratchet segments, tilting pawls extending transversely of said carrying element into recesses of said segments adapted when tilted to be wedged by one of said segments with one of said ratchet wheels to effect a drive to the ratchet wheel, and means driving said associated segments and carrying element.

2. In a device of the class described the combination with axle sections, of ratchet wheels secured on each thereof and rotatable independently of one another with said sections, a carrying element journaled on the hubs of said ratchet wheels, driving segments rigidly associated with said carrying element and having oppositely directed recesses therein, and tilting pawls pivotally mounted upon said carrying element with the ends thereof engaging in the recesses in adjacent segments, one end of a pawl adapted to drive one ratchet wheel and axle section in one direction, and the other end of the pawl adapted to drive the other ratchet wheel and axle section in the opposite direction, the pivotal mounting of the pawl permitting only one end thereof to be engaged with a ratchet wheel for driving at one time.

3. In a device of the class described the combination with independently rotatable axle sections, of ratchet wheels rigidly secured one on each of said sections, a carrying element journaled therebetween having recesses therein, tilting levers mounted in the recesses in said carrying element transversely thereof, one end thereof adapted to engage one of said ratchet wheels and the other end adapted to engage the other thereof for different directions of rotation, and springs holding said tilting levers in position permitting the same to be moved outwardly against the compression of the springs when one driven ratchet wheel rotates faster than the carrying element.

4. In a device of the class described the combination with axle sections, of ratchet wheels secured thereon, said ratchet wheels having extended hubs, a carrying element journaled on the inner extensions of each of said ratchet wheels, pawls pivotally mounted in said carrying element, driving segments rigidly associated with said carrying element adapted to engage with said pawls when engaged with the ratchet wheels to drive the ratchet wheels, end members journaled on the outer hub extensions of said ratchet wheels, rigid connections between said end members, said driving segments, and said carrying element, and means associated with one of said end members to drive the same and said segments and carrying element therewith.

5. In a device of the class described the combination with axle sections of ratchet wheels rigidly secured thereon, a carrying element journaled therebetween, walking beam pawls pivotally mounted transversely of said carrying element, one end of each of said pawls adapted for engagement with a ratchet wheel to drive the same in one direction and the other adapted for engagement with the other ratchet wheel to drive the same in an opposite direction, driving segments mounted concentrically of each of said ratchet wheels and rigidly associated with said carrying element, and having oppositely directed recesses for engagement with the ends of said pawls to wedge the same into engagement with the ratchet wheel or disengage the same therefrom, dependent upon the direction of rotation of the carrying element and segments, and means driving said associated carrying element and segments.

6. In a device of the class described the combination with the axle sections of a driving axle, of ratchet wheels secured on said respective sections, each of said ratchet wheels having hub extensions on each side thereof, a carrying element journaled on the inner hub extensions of said ratchet wheels, tilting pawls mounted transversely on said carrying element and capable of a tilting and pivotal movement, ratchet segments rigidly secured to said carrying element and disposed beyond the periphery of said respective ratchet wheels and adapted to wedge one end of a tilting pawl into engagement with the ratchet wheel, and means driving said associated ratchet segments and carrying element to impart a drive to the ratchet wheels.

7. In a device of the class described the combination with ratchet wheels, of a carrying element disposed therebetween, tilting pawls mounted transversely on said carrying element, one end of each pawl adapted for engagement with one ratchet wheel and the other end for engagement with the other ratchet wheel, a spring bearing centrally on each of said pawls to maintain the same in position on said carrying element, and driving ratchet segments rigidly associated with said carrying element adapted to wedgingly engage the ends of said pawls into the ratchet wheels to drive said ratchet wheels.

8. In a device of the class described the combination with ratchet wheels and a carrying element, of tilting pawls mounted transversely on said carrying element, each pawl adapted to engage one or the other of said ratchet wheels, and means adapted to wedgingly contact the ends of said pawls to thrust the same into engagement with said ratchet wheels to drive the same.

9. In a device of the class described the combination with ratchet wheels, of tilting pawls mounted transversely of said ratchet wheels, each pawl adapted at one of its ends to engage with one of said ratchet wheels and at its other end to engage with the other of said ratchet wheels, and means for wedgingly thrusting the ends of said pawls into driving engagement with said ratchet wheels.

10. In a device of the class described the combination with ratchet wheels, of tilting pawls for transmitting a drive thereto, said pawls mounted transversely of said ratchet wheels, the ends of each pawl adapted to engage said ratchet wheels, one end for one ratchet wheel and one end for the other ratchet wheel, and means maintaining said pawls engaged with said ratchet wheels and transmitting a drive thereto to relieve said pawls of bending stress.

11. A differential mechanism of the class described comprising independently movable elements, transversely mounted tilting pawls capable of universal movement arranged with one end adapted to drive one of said elements and the other the other of said elements, and mechanism transmitting a drive to said elements through said pawls permitting release of the pawls from said elements in the event of overtravel of said elements with respect to said pawls.

In testimony whereof we have hereunto subscribed our names in the presence of two subscribing witnesses.

GEORGE D. BAILEY.
FRANK E. RICE.

Witnesses:
H. P. BULL,
A. H. SCHLENKER.